United States Patent [19]

Mueller

[11] 4,285,660
[45] Aug. 25, 1981

[54] NOZZLE FOR A PLASTICS INJECTION MOLDING MACHINE, AN EXTRUDER ORIFICE, OR A HOT-CHAMBER TOOL

[75] Inventor: Walter Mueller, Battenberg, Fed. Rep. of Germany

[73] Assignee: Ewikon Entwicklung und Konstruktion GmbH & Co. Kommanditgesellschaft, Herford, Fed. Rep. of Germany

[21] Appl. No.: 41,514

[22] Filed: May 22, 1979

[30] Foreign Application Priority Data

Jun. 7, 1978 [DE] Fed. Rep. of Germany ....... 2824971

[51] Int. Cl.³ ............................. B29F 1/03; B29F 1/08
[52] U.S. Cl. ..................................... 425/549; 425/568
[58] Field of Search ................ 425/549, 564, 566, 568

[56] References Cited

U.S. PATENT DOCUMENTS

| 2,462,308 | 2/1949 | Dinzl | 425/549 X |
|---|---|---|---|
| 2,724,146 | 11/1955 | Smith | 425/549 X |
| 3,010,155 | 11/1961 | Gilmore | 425/549 X |
| 3,719,310 | 3/1973 | Hunten | 425/564 X |
| 3,945,535 | 3/1976 | Leiste | 425/549 X |
| 4,125,352 | 11/1978 | Gellert | 425/549 X |
| 4,161,386 | 7/1979 | Osuna-Diaz | 425/549 |

FOREIGN PATENT DOCUMENTS

| 2403510 | 8/1975 | Fed. Rep. of Germany | 425/549 |
|---|---|---|---|
| 2542162 | 4/1976 | Fed. Rep. of Germany | 425/549 |
| 2274430 | 1/1976 | France | 425/549 |

*Primary Examiner*—Thomas P. Pavelko
*Attorney, Agent, or Firm*—Michael J. Striker

[57] ABSTRACT

A nozzle for use in injection molding machines and the like is disclosed which heats the plastic melt maximally in the region of the injection zone. This is accomplished by a unique heating element which has a large surface area in this region. The nozzle is so designed as to create a suitable temperature gradient by interaction between cooperating flanges around the injection orifice and the element.

32 Claims, 29 Drawing Figures

NOZZLE FOR A PLASTICS INJECTION MOLDING MACHINE, AN EXTRUDER ORIFICE, OR A HOT-CHAMBER TOOL

SUMMARY OF THE INVENTION

The object of this invention is to provide an injector nozzle of this type which maximizes heat transfer to the melt at the injection zone and thus facilitates injection efficiency.

This object is achieved by specially designing the heating tip which is located at the injection zone. The tip is formed by a specially shaped heating rod and a specially shaped jacket which contacts the front end of the rod. Because of conductivity and surface area considerations in the designs utilized, an injector nozzle thus made concentrates heat transfer to the regions designed.

In this invention, the region between the heating rod and the jacket is hollow and is open at both ends, defining a flow channel for the melt. At the lower end, or forward and, of the heater, the rod is shaped to have a high surface area so as to maximize heat transfer to the melt. However, the rod is also designed to have a small cross-sectional area near its forward end. This results in a high local resistance and a high degree of heat production. Moreover, the forward end of the rod is shaped to form a point at the bottom and is tapered to a region of maximum surface width which is located above the point. This has the simultaneous effect of concentrating high temperatures at the tip while reducing self-heating and thereby reducing energy consumption.

As a result of the construction of the rod and jacket, a very durable nozzle is made which can withstand the high stresses resulting from impact of the melt. Moreover, the design of the nozzle makes restarting after shut down a quick process, since heat production is large. Finally, it is to be noted that the heating characteristics of the nozzle are mainly determined by its shape. Hence, it is unnecessary to provide precise electrical control apparatus for use with the nozzle's power supply. Thus, economics can be effected.

DETAILED DESCRIPTION OF THE PREFERRED EMBODIMENTS

Figure 2:
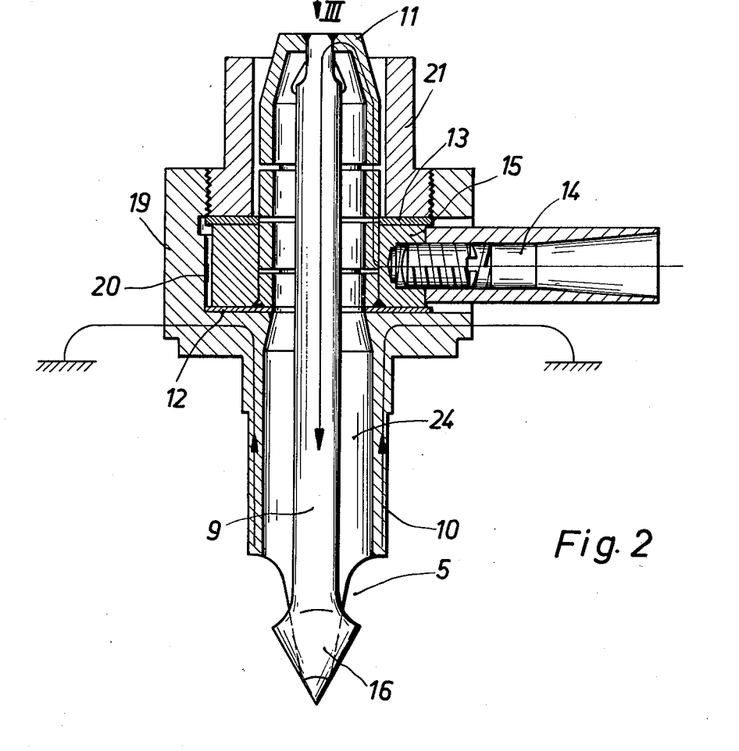
FIG. 2 shows a vertical sectional view of a first embodiment of the invention.
Figure 3:
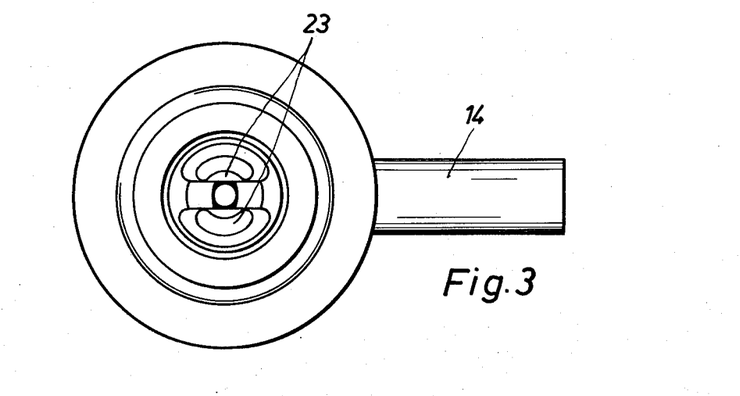
FIG. 3 shows a top view of the first embodiment of the invention.
Figures 4, 5, 6, 7, 8, 9, 10:
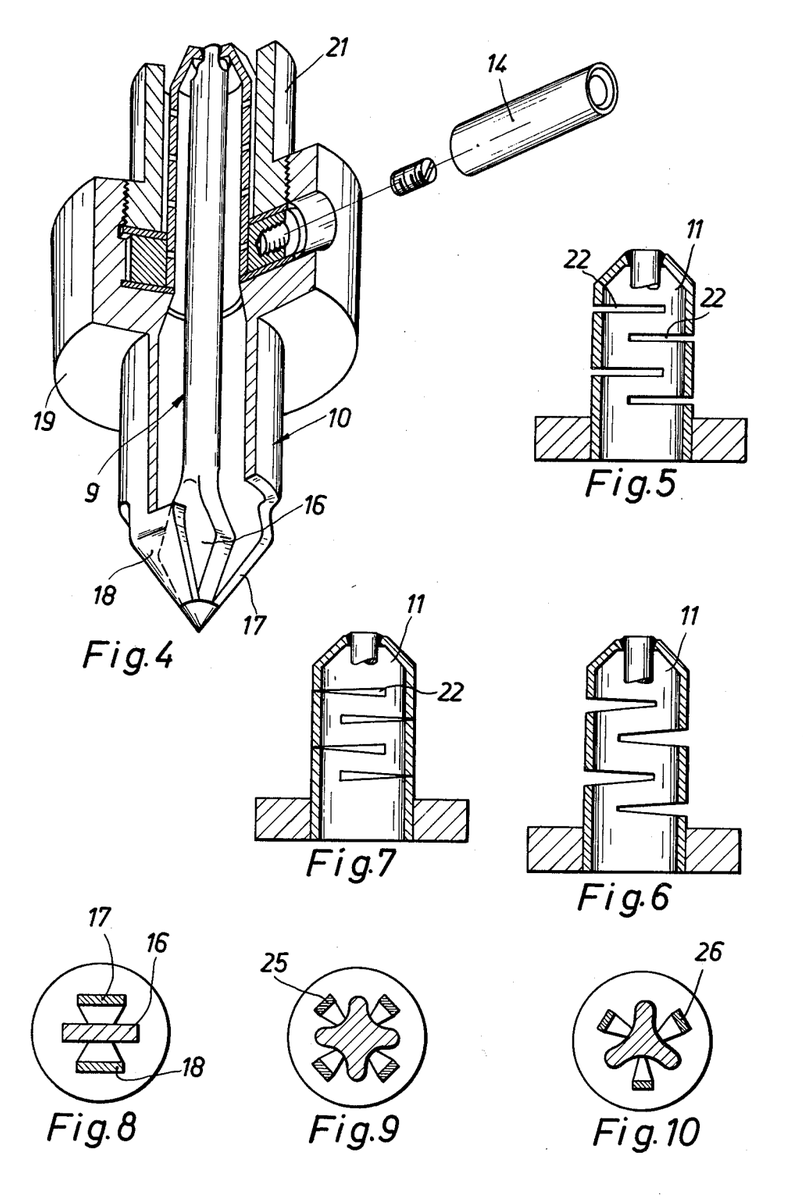
FIG. 4 is a perspective view of the first embodiment of the invention partially cut away to show construction details.
FIGS. 5, 6 and 7 show vertical sectional views of the rear jacket in various stages of deformation resulting from the heating process.
FIGS. 8, 9 and 10 show horizontal sections through three modifications of the invention.

Referring first to FIGS. 2-4, the first embodiment of the invention can be seen to have a forwardly elongated central heating rod 9 with a lance-shaped tip 16 at its forward end. This rod is made of a chrome nickel steel alloy.

A hollow cylindrical housing 19 surrounds the rod and is concentric therewith, and has an integral forward jacket portion 10. This portion 10 is also hollow and cylindrical, and diametrically opposed triangular flanges 17 and 18 bridge across the forward end of portion 10 with their forwardmost ends coming together to meet the forwardmost point of tip 16. Hence, it may be seen that a chamber 27 is formed between the rod and the portion 10, which chamber is open at two diametrically opposed orifice 5. The housing and its forward jacket portion are made of construction steel.

The rear end of rod 9 is secured to an elongated ream jacket 11 by clip 11A. Jacket 11 has a hollow interior and a bridge 11B across its rear end to which bridge the clip is secured. Ports 23 communicate with the interior of the jacket 11. The jacket 11 is made of construction steel and has inwardly extending state 22 which alternate along the length of the jacket.

A toroidal connection ring 15 encircles the forward end of jacket 11 and is attached hereto to make a good electrical connection. On the forward and rearward periphery of the ring 15 are located annular insulating discs 12 and 13, which are made of aluminum oxide ceramic to withstand high temperatures and stresses between 5 and 10 kp/cm$^2$. The whole device is held together by a nut 21 which is threaded into a corresponding portion of the housing 19 at regions 19A. It can be seen that the nut 21 squeezes the connection ring between itself and the housing, with the ring being insulated from the nut and housing by the discs 12 and 13. Since the ring is secured to the jacket 11, the rod 9 is held rigidly in the position shown between the flange 17 and 18 and the bridge 11B. It should also be noted that chamber 20 separates the circumferential surface of ring 15 from the housing 19.

Hence, an AC source with its hot side connected to ring 15 via plug 14 and its cold side connected to grounded housing 19 will cause current to flow through the ring 15, jacket 11, rod 9, tip 16, flanges 17 and 18 and front jacket portion 10 to grounds. This will cause the device to heat up, resulting from heating losses in the rod.

It can be seen that plastic melt can be rammed into ports 23 and can travel through chamber 24 and out orifice 5. To compensate for thermal expansion of the rod, slots 22 allow the jacket 11 to expand and contract. The slots may initially have the shapes shown in FIGS. 7 or 5 after the nut 21 has been firmly screwed into housing 19. After the device has heated, the slots may assume the shape shown in FIGS. 5 or 6.

Because the cross-section of the tip 16 at flange 17 and 18 is small, the local resistance there is high and the nozzle becomes hottest at its forward tip, with possible temperature ranging up to 400° C. As the tip widens, the surface area of the tip increases and allows an efficient transfer of heat to the melt in the region of the orifice 5, since the radially outermost edge of the tip "poke through" the orifice 5 to the outside. The configuration of flanges 17 and 18 also helps to determine heat transmission to the melt. Since the melt is always directly contacting the heated parts of the nozzle, no lag time exists for the heating of any elements intermediate the melt and the heated element and the operation of the device is almost inertia-free. Hence, the nozzle can be safely subjected to high melt feed pressure, and such pressure can range to approximately 1,200 kp/cm$^2$ without breaking the flanges 17, 18. It should also be noted that the arrangement of slots 22 in jacket 11 has some bearing on current flow through the circuit, and hence on the temperature of the nozzle.

It can now be seen that the temperature distribution over the various portions of this nozzle is a function of the relative shapes and sizes of the tip 16 and flanges 17 and 18. Hence, elaborate temperature control provision need not be made and it is only necessary to provide a reasonably constant power supply.

The selection of dimensions can be so made that the ratio of the surface area of the rod (including the tip) to the interior surface which bonds the chamber 24 (including the interior surface of portion 10 and jacket 11) is between 1:1.5 and 1:3.5. Preferably, this ratio can be between 1:2 and 1:3, and optimally, the ratio can be set at 1:2.5. An injection nozzle so designed will cause an insulating layer of melt to build up on said interior surfaces, which facilitates operation. If the nozzle is shut off, the melt will solidify, but this layer will re-form upon subsequent startup. This ratio also can be applied with advantage in the various modifications and embodiments discussed hereafter.

Figure 1:
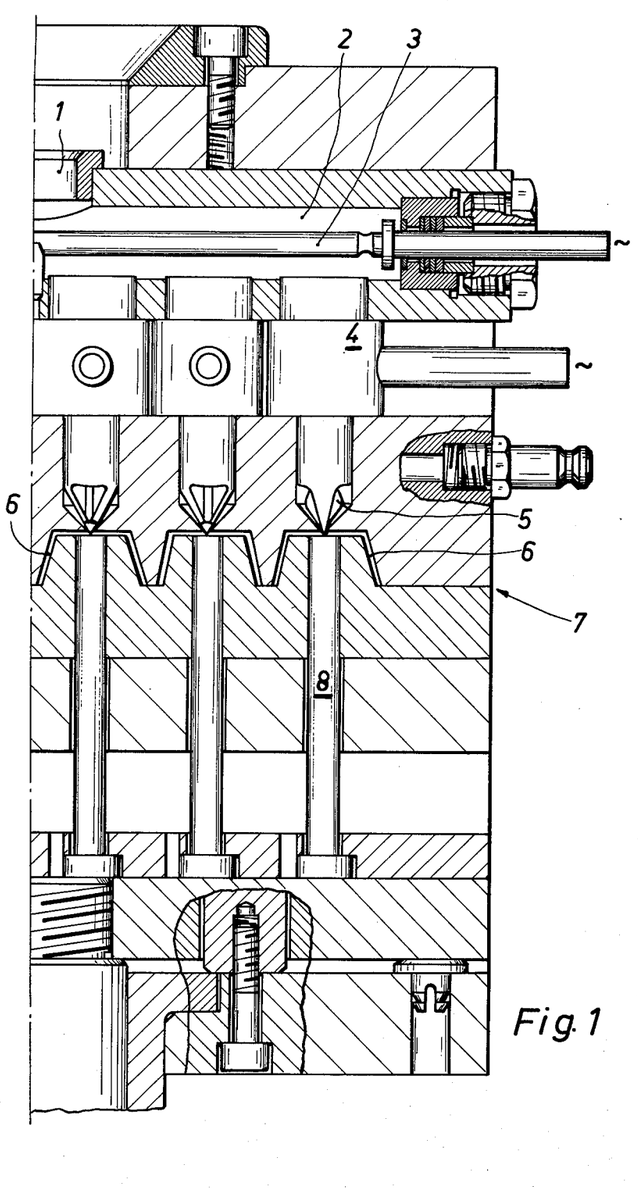
FIG. 1 shows a vertical sectional view of a machine in which the invention is utilized.

FIG. 1 shows a possible arrangement in which this invention is utilized, namely a hot-chamber tool. This figure shows a retaining bush for a machine nozzle. A manifold channel 2 is filled by this machine nozzle and contains an extended heating wire 3 for the heating of the plastic melt. From the manifold channel 2, the plastic melt flows into heating elements 4, their rear end projecting into the manifold channel 2. The plastic melt passes through the heating element 4 and will reach, through the orifices 5 at the front end of the heating elements, the mold cavities 6. Opening the tool for removal of the solidified molded pieces is made within the plane 7. The molded pieces are removed from the mold cavity by the ejectors 8.

FIGS. 9 and 10 show that the heating rod 9 may have a front end in the shape of a cross or star. In FIG. 9, four ribs 25 are allotted to the front end of the heating rod, while in the design as per FIG. 10, three ribs 26 are provided. These ribs 25 and 26 are, as are the ribs 17 and 18, connected to the heating rod at the front of tip 16.

Figure 11:
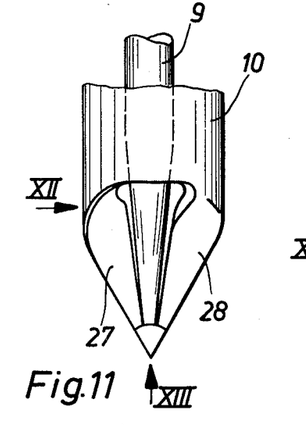
FIGS. 11, 12 and 13 show, respectively, the side views and a horizontal sectional view of a fourth modification of the invention.
Figure 12:
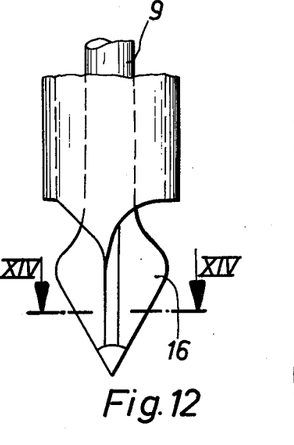
Figure 13:
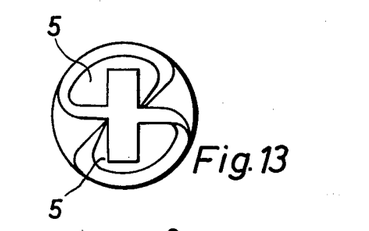

In FIGS. 11 to 13, the front end of a heating element is shown, to which the ribs 27, 28 connected to the jacket part 10, are rotated by 90° before being joined to the heating rod 9.

By these measures, the flow resistance of the plastic melt within the zone of the front orifices 5 is reduced, simultaneously, mixing and homogenizing the plastic melt as it is delivered.

Figure 14:
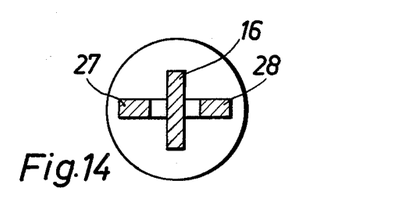
FIGS. 14, 15 and 16 show horizontal sectional views of, respectively, fifth, sixth and seventh modifications of the invention.

In FIG. 14, a section along the line XIV—XIV of FIG. 12 is shown.

Figure 15:
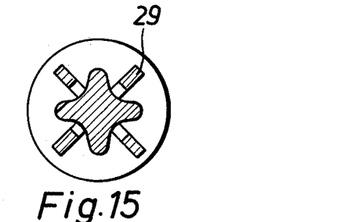
Figure 16:
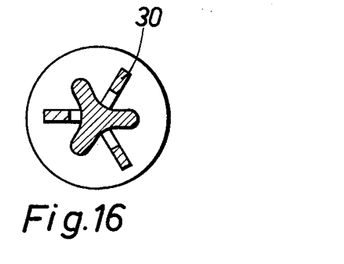

FIGS. 15 and 16 show that the front end of the heating rod may have a profile deviating from the lance-like shape, with the ribs being rotated by 90°. FIG. 15 shows a cruciform and FIG. 16 a stellate heating rod. The ribs 29 and 30 appurtenant to the heating rods, are also rotated by 90° relative to the jacket part, and were then fastened to the front tip of the heating rod by welding or soldering.

Figure 17:
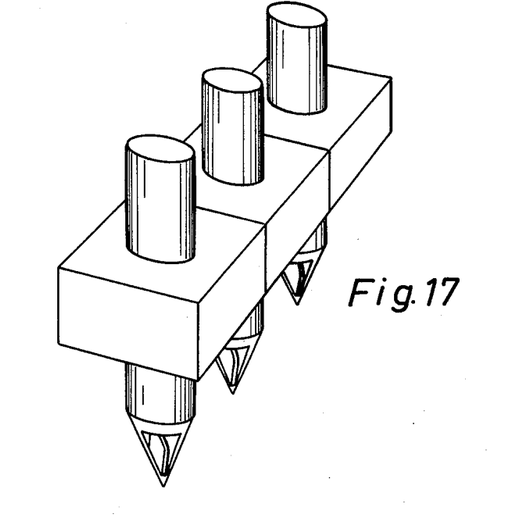
FIG. 17 shows a possible arrangement of three injection nozzles in a row in perspective view.

FIG. 17 shows, that the rear part 19 of the front jacket portion 10, may also be designed quadrangular or block-like. Several heating elements may also share a common block.

Figures 18, 19:
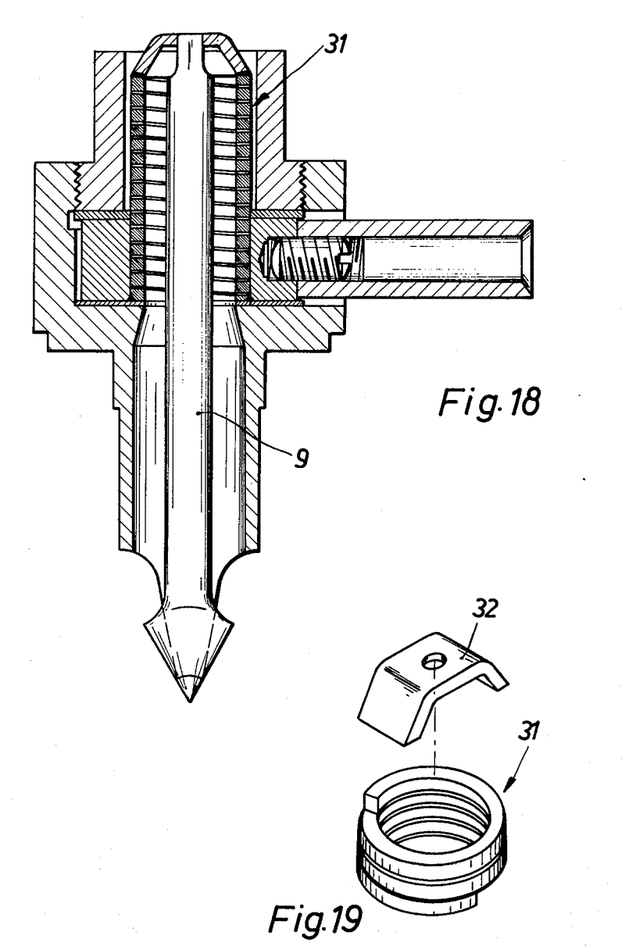
FIGS. 18 and 19 show, respectively, a vertical section of a second embodiment of the invention and an exploded perspective view of a portion thereof.

In the example as per the FIGS. 18 and 19, the rear jacket 11 is designed as a cylindrical helical spring. This cylindrical helical spring is attached at its rear end to the heating rod 9 by a bracket 32. Otherwise, the construction of the heating element as per FIG. 18 corresponds to the one as per FIG. 2.

Figure 20:
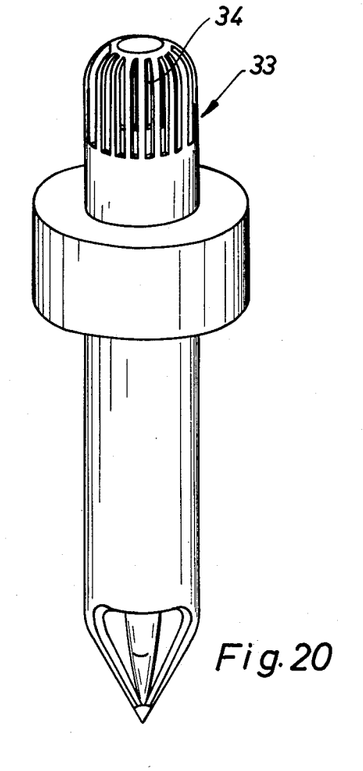
FIGS. 20 and 21 show, respectively, perspective and vertical detail sectional views of a third embodiment of the invention.
Figure 21:
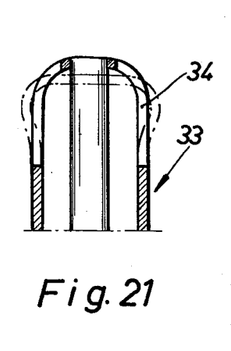

The rear jacket part 33 in the example as per FIGS. 20 and 21 is screenlike and is provided with longitudinal slots 34.

The ribs delineating the longitudinal slots may be deformed under heat stresses during operation, and assume, for instance, a shape as is indicated by the dash-dot lines of FIG. 21.

Figure 22:
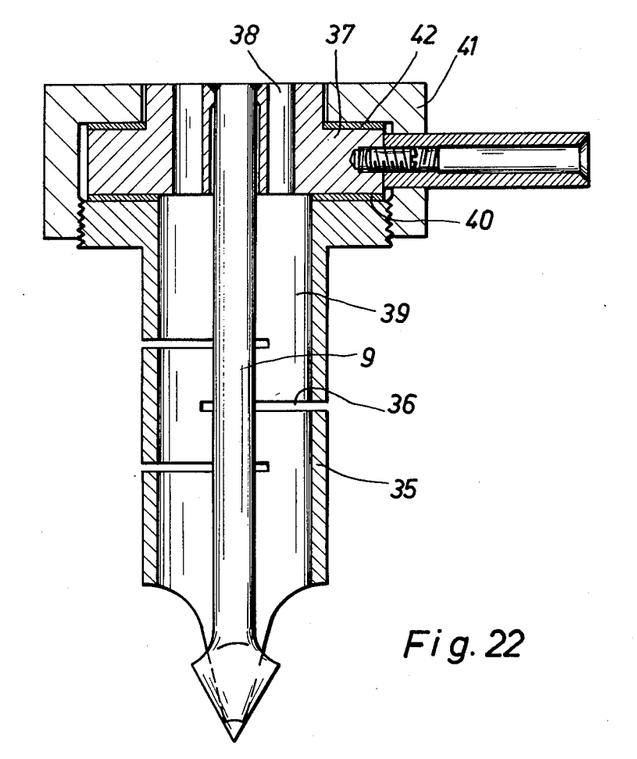
FIGS. 22, 23, 24 and 25 show, respectively, vertical sections of a fourth, a fifth, a sixth and a seventh embodiment of the invention.

An injector nozzle is shown in FIG. 22, in which the front part of the jacket 35 is provided with slots 36 which allow compensating for expansion caused by heat stresses during operation. The rear part of the jacket 37 is of a disc-like shape and provided with passages 38 for the introduction of plastic melt into passage 39. The front part of the jacket 35 is insulated by an insulating disc 40 against the rear part of the jacket 37. An insulating disc 42 is also provided between the rear disc of the union nut 41 which locates the two parts of the jacket relative to each other, and the rear part of the jacket 37.

Figure 23:
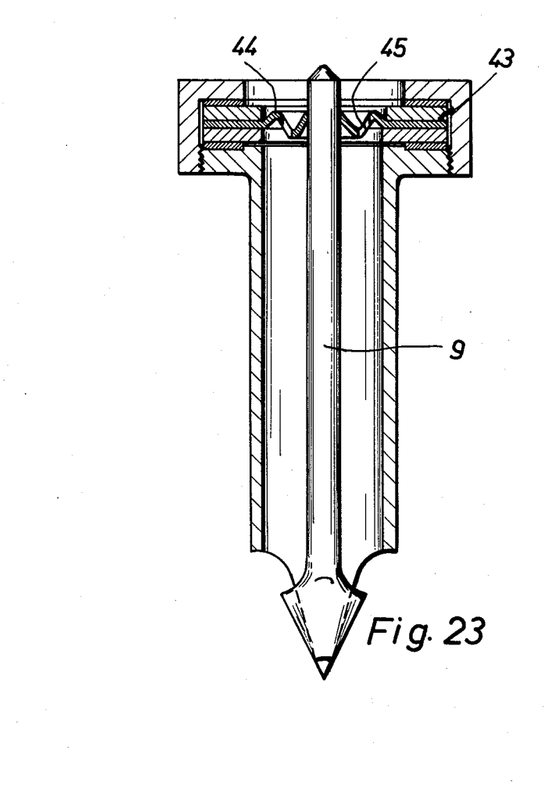

In the example as per FIG. 23, the rear jacket part 43 is provided with a metallic diaphragm 44 which has bores 45 for the passage of the plastic melt. The internal rims of the metallic diaphragm are rigidly connected to the heating rod 9, so that expansion compensation may be effected between the functional parts of the heating element by flexing of the diaphragm.

Figure 24:
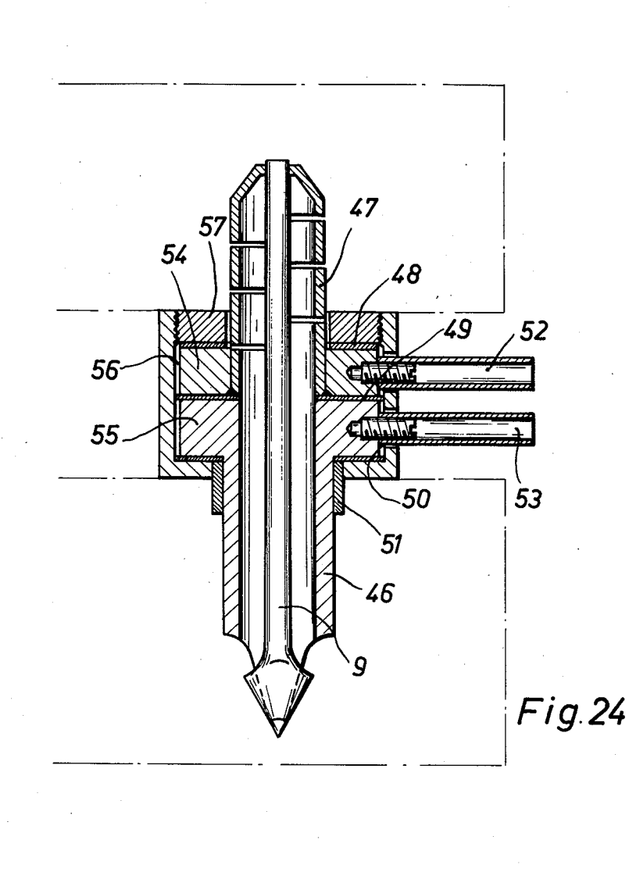
Figure 26:
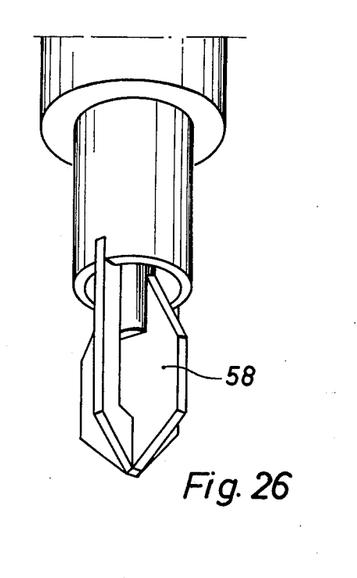
FIGS. 26 and 27 are, respectively, perspective views of an eighth modification of the invention in an assembled and an exploded state.
Figure 27:
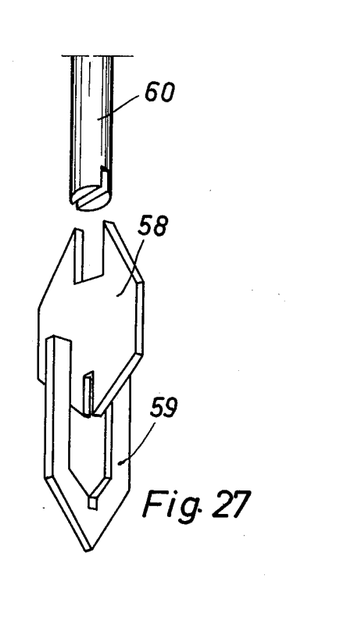

FIG. 24 shows a heating element in which the front jacket part 46 and the rear jacket part 47 are electrically insulated from the injection tool. The insulating discs 48, 49, and 50, as well as the sleeve 51 serve to effect this insulation. Current is conducted via the connections 52 and 53. The contact ring 54 and the rear part 55 of the front jacket part 46 are arranged within a cylindrical annular chamber 56 which is closed by a circular nut 57. It results from the FIGS. 26 and 27 show that the front end of the heating rod may be designed as a separate form piece 58. This form piece may be designed as a punched sheet metal part or as a stamped part. In this construction, the orifices will be restricted by lands designed as U-shaped parts 59. This form parts, as can be seen from FIG. 27 in particular, can be assembled by pushing together as mating pieces and can then be fastened to each other or connected to the heating rod 60 respectively, by welding or soldering.

Figure 28:
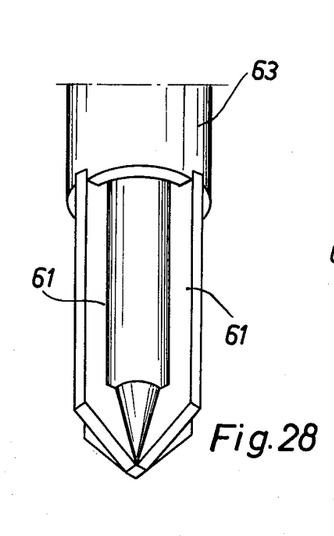
FIGS. 28 and 29 are, respectively, perspective views of a ninth modification of the invention in an assembled and an exploded state.
Figure 29:
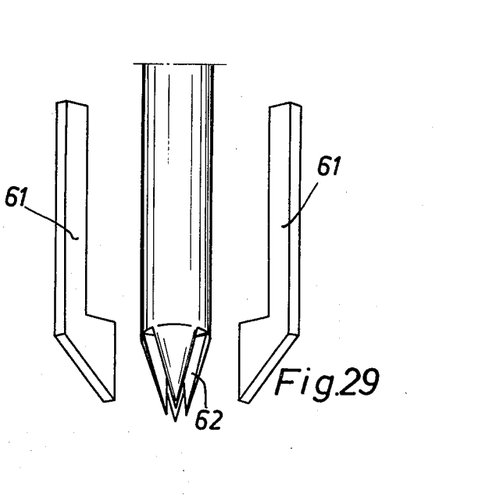

It is also conceivable to design the front end and of the heating element according to FIGS. 28 and 29. In this construction the lands restricting the orifices are represented by the angular-shaped form pieces 61 which are inserted and located in recesses 62 of the front tip of the heating rod and connected at their other end with the front jacket piece 63.

In the examples as discussed, heating rods were represented showing a cross section of circular shape. It is of course also possible to insert heating rods with a cross section deviating from the angular shape.

Figure 25:
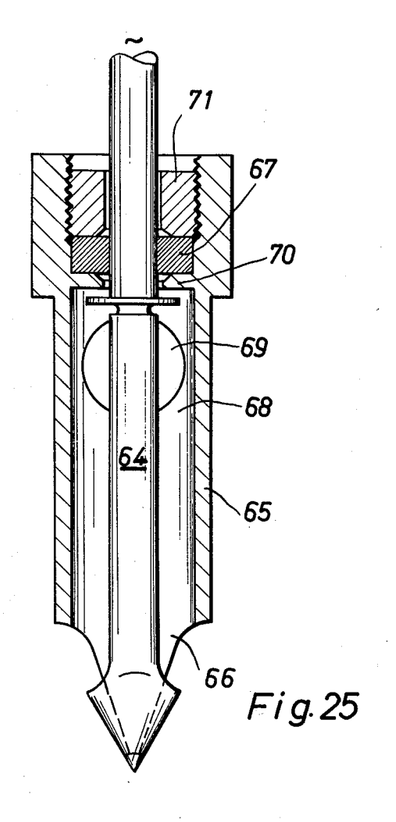

In FIG. 25, a heating element is shown, in which a one-piece metallic jacket 65 is made appurtenant to the heating rod 64. The heating rod is connected at its front end with the ribs 66 of the jacket. Electrical insulation between the heating rod 64 and the jacket, in the zone of the rear end of the jacket is effected by a gasket 67. This gasket also forms the limit of the rear end of the channel 68 of the heating element which is supplied with the plastic melt that can be introduced into lateral port 69. Gasket 67 rests on an interior flange 70 of the jacket. This interior flange, also forms the rear-end limit of the channel 68 of the heating element.

The tip of the heating element can be provided with a valve cone which will fit the valve seat in the gate bush or in the mold cavity. The description has been intended to be merely descriptive of the invention. It is designed to be illustrative of, but not to be limiting of, the scope of the invention for which protection is claimed. This scope is to be determined only by the claims which follow:

I claim:

1. A nozzle for use in plastic injection moulding machines, extruder orifices, hot chamber tools and the like, comprising: a hollow forwardly elongated body with an interior bounded by an interior surface, a forward end in which at least one orifice is located, the orifice communicating with the interior of the body; and a single unitary elongated resistance heating element located within the interior and having an enlarged pointed head adjacent to and projecting in part out of said at least one orifice, the head being so shaped as to have a maximal surface area with the point adjacent said at least one orifice.

2. The nozzle defined by claim 1, wherein the body further includes a part located in a rear end of the body.

3. The nozzle defined by claim 1, wherein the body further includes a part located intermediate the forward end of the body and a rear end thereof.

4. The nozzle defined by claim 1, wherein the body has two orifices located at its forward end.

5. The nozzle defined by claim 1, wherein the head is lance-shaped at a forward end of the element.

6. The nozzle defined by claim 5, wherein the element and head are unitary.

7. The nozzle defined by claim 5, wherein the element and head are of separate pieces which are joined together.

8. The nozzle defined by claim 6, wherein the element has a circular cross-section all along its length above the head.

9. The nozzle defined by claim 8, wherein the head has two transverse blades.

10. The nozzle defined by claim 9, wherein the head has a rectangular cross-section.

11. The nozzle defined by claim 10, wherein the blades extend out of the orifices.

12. The nozzle defined by claim 8, wherein the head has a cruciform cross-section.

13. The nozzle defined by claim 8, wherein the head has a stellate cross-section.

14. The nozzle defined by claim 7, wherein at least some of the pieces are made of plate material.

15. The nozzle defined by claim 1, wherein a ratio in which an area of an exterior surface of the element is the numerator and in which an area of the interior surface of the body is the denominator, is between 1:1.5 and 1:3.5.

16. The nozzle defined by claim 15, wherein the ratio is 1:2.5.

17. The nozzle defined by claim 1, wherein said at least one orifice is formed by flanges which are connected to each other and are integral with at least a portion of the body.

18. The nozzle defined by claim 17, wherein there are two orifices and the flanges are triangular in shape.

19. The nozzle defined by claim 17, wherein the flanges are all connected to the forwardmost end of the head.

20. The nozzle defined by claim 1, wherein the body is electrically conductive and is at least partly in series with the element.

21. The nozzle defined by claim 20, wherein the body is in two parts which are electrically insulated from each other and which are each electrically connected to a corresponding end of the heating element.

22. The nozzle defined by claim 21, wherein one of said parts is shaped so as to be deformable under thermal expansion of the element.

23. The nozzle defined by claim 22, wherein said one part is shaped into a diaphragm.

24. The nozzle defined by claim 22, wherein said one part is formed of a cylindrical helical spring.

25. The nozzle defined by claim 22, wherein said one part is provided with slots.

26. The nozzle defined by claim 25, wherein the slots are oriented longitudinally with respect to the body.

27. The nozzle defined by claim 25, wherein the slots are oriented transversely with respect to the body.

28. The nozzle defined by claim 27, wherein said one part is located at the rear end of the body.

29. The nozzle defined by claim 27, wherein said one part is located at the front end of the body.

30. The nozzle defined by claim 21, wherein one of said parts is electrically grounded.

31. The nozzle defined by claim 21, further including insulation so located that the body is electrically insulated from ground.

32. The nozzle defined by claim 21, wherein the insulation is accomplished by discs of aluminum-oxide ceramic.

* * * * *